US012122548B2

(12) United States Patent
Zheng

(10) Patent No.: US 12,122,548 B2
(45) Date of Patent: Oct. 22, 2024

(54) ARTICLE PACKAGE FILLING METHOD, ARTICLE PACKAGING METHOD AND DEVICE, AND CONTROL SYSTEM

(71) Applicant: BEIJING GEEKPLUS TECHNOLOGY CO., LTD., Beijing (CN)

(72) Inventor: Yong Zheng, Beijing (CN)

(73) Assignee: BEIJING GEEKPLUS TECHNOLOGY CO., LTD., Beijing (CN)

( * ) Notice: Subject to any disclaimer, the term of this patent is extended or adjusted under 35 U.S.C. 154(b) by 436 days.

(21) Appl. No.: 17/418,261

(22) PCT Filed: Jul. 24, 2019

(86) PCT No.: PCT/CN2019/097460
§ 371 (c)(1),
(2) Date: Jun. 25, 2021

(87) PCT Pub. No.: WO2020/134050
PCT Pub. Date: Jul. 2, 2020

(65) Prior Publication Data
US 2022/0033123 A1    Feb. 3, 2022

(30) Foreign Application Priority Data

Dec. 26, 2018  (CN) .......................... 201811608728.7
Feb. 2, 2019    (CN) .......................... 201910106909.8

(51) Int. Cl.
*B65B 5/08*    (2006.01)
*B65B 5/10*    (2006.01)
(Continued)

(52) U.S. Cl.
CPC ............... *B65B 55/20* (2013.01); *B65B 5/08* (2013.01); *B65B 5/105* (2013.01); *B65B 57/12* (2013.01);
(Continued)

(58) Field of Classification Search
CPC .. B65B 5/08; B65B 5/10; B65B 5/105; B65B 57/12; B65B 57/14; B65B 2210/04;
(Continued)

(56) References Cited

U.S. PATENT DOCUMENTS 6,721,762 B1 * 4/2004 Levine et al. .......... G06Q 10/08
707/999.102
9,828,128 B1 * 11/2017 Linnell et al. .......... B65B 5/105
(Continued)

FOREIGN PATENT DOCUMENTS

| CN | 105000224 A | * 10/2015 | ............. B65B 55/20 |
| CN | 108527322 A | * 9/2018 | ........... G06Q 10/087 |
| CN | 108876230 A | * 11/2018 | ............. G06Q 10/08 |

OTHER PUBLICATIONS

Bin packing problem, Wikipedia, retrieved from: https://en.wikipedia.org/w/index.php?title=Bin_packing_problem&oldid=874509210.

*Primary Examiner* — Stephen F. Gerrity
(74) *Attorney, Agent, or Firm* — Bayramoglu Law Offices LLC

(57) ABSTRACT

An article package filling method, comprising: selecting a packaging container for an order article in an order container; picking out the order article from the order container and putting same into the packaging container; and injecting a filling medium into a filling space of the packaging container by using a filling equipment, wherein the filling medium has a specific shape before being injected into the filling space, and can form a spatial shape consistent with that of the filling space after being injected into the filling space. According to the filling method, various specifica- (Continued)

tions or types of packaging containers storing the order articles can be filled, so that the supporting and protecting effects on the order articles are implemented, and the package filling efficiency and applicability are improved.

6 Claims, 9 Drawing Sheets

(51) Int. Cl.
    *B65B 55/20*     (2006.01)
    *B65B 57/12*     (2006.01)
    *B65B 59/00*     (2006.01)
    *B65G 61/00*     (2006.01)
    *G06Q 10/08*     (2024.01)

(52) U.S. Cl.
    CPC .......... *B65B 59/001* (2019.05); *B65B 59/003* (2019.05); *B65G 61/00* (2013.01); *G06Q 10/08* (2013.01); *B65B 2210/04* (2013.01); *B65B 2220/14* (2013.01)

(58) Field of Classification Search
    CPC .... B65G 1/1373; B65G 1/1378; G06Q 10/08; G06Q 10/087
    See application file for complete search history.

(56) References Cited

U.S. PATENT DOCUMENTS

| | | | |
|---|---|---|---|
| 10,540,821 B2* | 1/2020 | Musunuri et al. | G06Q 10/08 |
| 10,926,952 B1* | 2/2021 | Shi et al. | B65G 1/1373 |
| 2003/0110102 A1* | 6/2003 | Chien et al. | G06Q 10/08 |
| | | | 705/28 |
| 2009/0277139 A1* | 11/2009 | Eckel | B65B 57/12 |
| | | | 53/474 |
| 2011/0295413 A1* | 12/2011 | Hara et al. | G06Q 10/087 |
| | | | 700/216 |
| 2013/0000252 A1 | 1/2013 | Pettersson et al. | |
| 2015/0073587 A1 | 3/2015 | Vliet et al. | |
| 2016/0167228 A1* | 6/2016 | Wellman et al. | B65G 1/1378 |
| | | | 901/3 |
| 2017/0081067 A1* | 3/2017 | Aze et al. | B65B 57/12 |
| 2018/0004779 A1* | 1/2018 | Moore et al. | B65B 59/003 |
| 2018/0215485 A1* | 8/2018 | Koet et al. | B65G 1/1378 |
| 2020/0039745 A1* | 2/2020 | Khodl et al. | B65G 1/1378 |
| 2020/0039748 A1* | 2/2020 | Khodl et al. | B65G 1/1378 |

* cited by examiner ns ARTICLE PACKAGE FILLING METHOD, ARTICLE PACKAGING METHOD AND DEVICE, AND CONTROL SYSTEM

CROSS-REFERENCE OF RELATED APPLICATIONS

The present application is a US National Stage of International Application No. PCT/CN2019/097460, filed on Jul. 24, 2019, which claims the priorities from Chinese Patent Application No. 201811608728.7, filed Dec. 26, 2018, and Chinese Patent Application No. 201910106909.8, filed Feb. 2, 2019, which are hereby incorporated by reference in their entireties.

TECHNICAL FIELD

Embodiments of the present application relate to the technical field of warehousing and logistics, for example, to an item packaging and filling method, an item packaging method, an apparatus, and a control system.

BACKGROUND

The rapid development of e-commerce has brought unprecedented development opportunities for the logistics industry, but also posed serious challenges to logistics services. The packaging requirements for transported items also are becoming higher and higher.

In a warehousing system, after order items are picked based on a "goods-to-person" mode, the order items need to be packaged and shipped. Due to various shapes and properties of items, and various specifications of packaging containers, such as packaging boxes, for packaging items, it is difficult for the packaging containers to perfectly match the items to be packaged. A working person usually fill a filling medium such as waste newspaper, inflated bags or foam boards of a matching shape between items and a packaging container, to support the items during transport of the items, thereby preventing the items from being damaged due to shaking.

However, a packaging process in the related technology is performed in a manual packaging manner, and in the process of packaging, not only does a working person need to spend time to fill the above-mentioned filling medium, but also the filling medium often needs manual secondary cutting to conform the filling medium to a fillable space, resulting in greatly increased time of the packaging process, and thus affecting the shipment efficiency of the entire warehouse.

In addition, in warehousing services, a packing process is usually performed in such a manner that: in a packing area, a person selects required items in a picking container according to the content of a user order, and needs to decide a placement strategy of goods in a packaging box according to item attributes, for example, whether they are resistant to pressure and whether they are fragile.

However, with the growing demand for online shopping, user orders increase rapidly. In the packing process, the number of items transferred to picking containers by tireless mobile robots that work day and night increases dramatically, and the manual packing efficiency is obviously low, resulting in a backlog of goods and slow stock-out of commodities, and affecting warehousing operational efficiency and user experience.

SUMMARY

Embodiments of the present application provide an item packaging and filling method, an item packaging method, an apparatus, and a control system, to solve at least one of the above-mentioned problems.

An embodiment of the present application provides an item packaging and filling method, including:
 selecting a packaging container for an order item in an order container;
 taking the order item from the order container and putting the same into the packaging container; and
 punching a filling medium into a fillable space in the packaging container by using a filling device, wherein the filling medium does not have a defined shape before punched into the fillable space, and forms a space shape consistent with the fillable space after punched into the fillable space.

In this embodiment of the present application, packaging containers of various specifications or models in which order items are placed can be filled to support and protect the order items in the packaging containers, thus avoiding manual secondary processing of the filling medium in the package filling process, improving the package filling efficiency and applicability, and saving manpower and material costs.

An embodiment of the present application provides an item packaging method, including:
 acquiring a user order;
 based on item attributes pre-stored in a database, performing packaging analysis on items indicated by the user order, and determining a packaging model, the packaging model defining optimal spatial placement postures of the items indicated by the user order in a packaging box;
 determining a packaging sequence in which the items indicated by the user order are to be placed into a turnover box, based on the optimal spatial placement postures of the items indicated by the user order in the packaging box;
 transmitting a first instruction and a second instruction, wherein
 the first instruction is used to instruct a picking robot to select items based on the packaging sequence and placing selected items into the turnover; and
 the second instruction is used to instruct a packaging robot to move the items in the turnover box to the packaging box in sequence.

An embodiment of the present application provides an item packaging apparatus, including:
 an order acquisition module configured to acquire a user order;
 a first determination module configured to, based on item attributes pre-stored in a database, perform packaging analysis on items indicated by the user order, and determine a packaging model, the packaging model defining optimal spatial placement postures of the items indicated by the user order in a packaging box;
 a determination module configured to determine a packaging sequence in which the items indicated by the user order are to be placed into a turnover box, based on the optimal spatial placement postures of the items indicated by the user order in the packaging box;
 a first instruction transmitting module configured to transmit a first instruction, the first instruction being used to instruct a picking robot to select items based on the packaging sequence and place the selected items into the turnover box; and a second instruction transmitting module configure to transmit a second instruction, the second instruction being used to instruct a packaging robot to move the items in the turnover box to the packaging box in sequence.

An embodiment of the present application provides a control system, including:
- at least one processor; and
- a memory communicably connected with the at least one processor, wherein
- the memory stores instructions executable by the at least one processor, and the instructions are executed by the at least one processor to cause the at least one processor to execute the above-mentioned item packaging method.

An embodiment of the present application provides an item packaging method, including:
- receiving an instruction of moving items in a turnover box to a packaging box in sequence; and
- moving the items in the turnover box to the packaging box in sequence for packing,
- wherein the items in the turnover box are obtained in such a manner that: a picking robot picks items according to a packaging sequence of items indicated by a packaging model, and places the picked items into the turnover box; and
- the packaging sequence is determined after analyzing received item attributes indicated by the user order by a control system.

An embodiment of the present application provides an item packaging apparatus, including:
- a receiving module configured to receive an instruction of moving items in a turnover box to a packaging box in sequence; and
- a packaging module configured to move the items in the turnover box to the packaging box in sequence for packing,
- wherein the items in the turnover box are obtained in such a manner that: a picking robot picks items according to a packaging sequence of items indicated by a packaging model, and placing the picked items into the turnover box; and
- the packaging sequence is determined after analyzing received item attributes indicated by the user order by a control system.

An embodiment of the present application provides a packaging robot, including: at least one processor; and a memory communicably connected with the at least one processor, wherein
- the memory stores instructions executable by the at least one processor, and the instructions are executed by the at least one processor to cause the at least one processor to execute the item packaging method in any of the foregoing implementations.

An embodiment of the present application provides an item stock-out system for warehousing, including:
- a control system, at least one picking robot and at least one packaging robot, wherein
- the control system is configured to analyze items indicated by an acquired user order based on item attributes pre-stored in a database, determine a packaging model including an item packaging sequence, and transmit a first instruction and a second instruction according to the packaging model;
- the picking robot is configured to receive the first instruction, and picks items based on the packaging sequence and places the picked items into the turnover box, according to the first instruction; and
- the packaging robot is configured to receive the second instruction, and move the items in the turnover box to a packaging box in sequence.

In the solution provided in the present application, items are arranged in a preset sequence before being boxed, so the item packaging efficiency is improved.

DETAILED DESCRIPTION OF THE EMBODIMENTS

Figure 1:
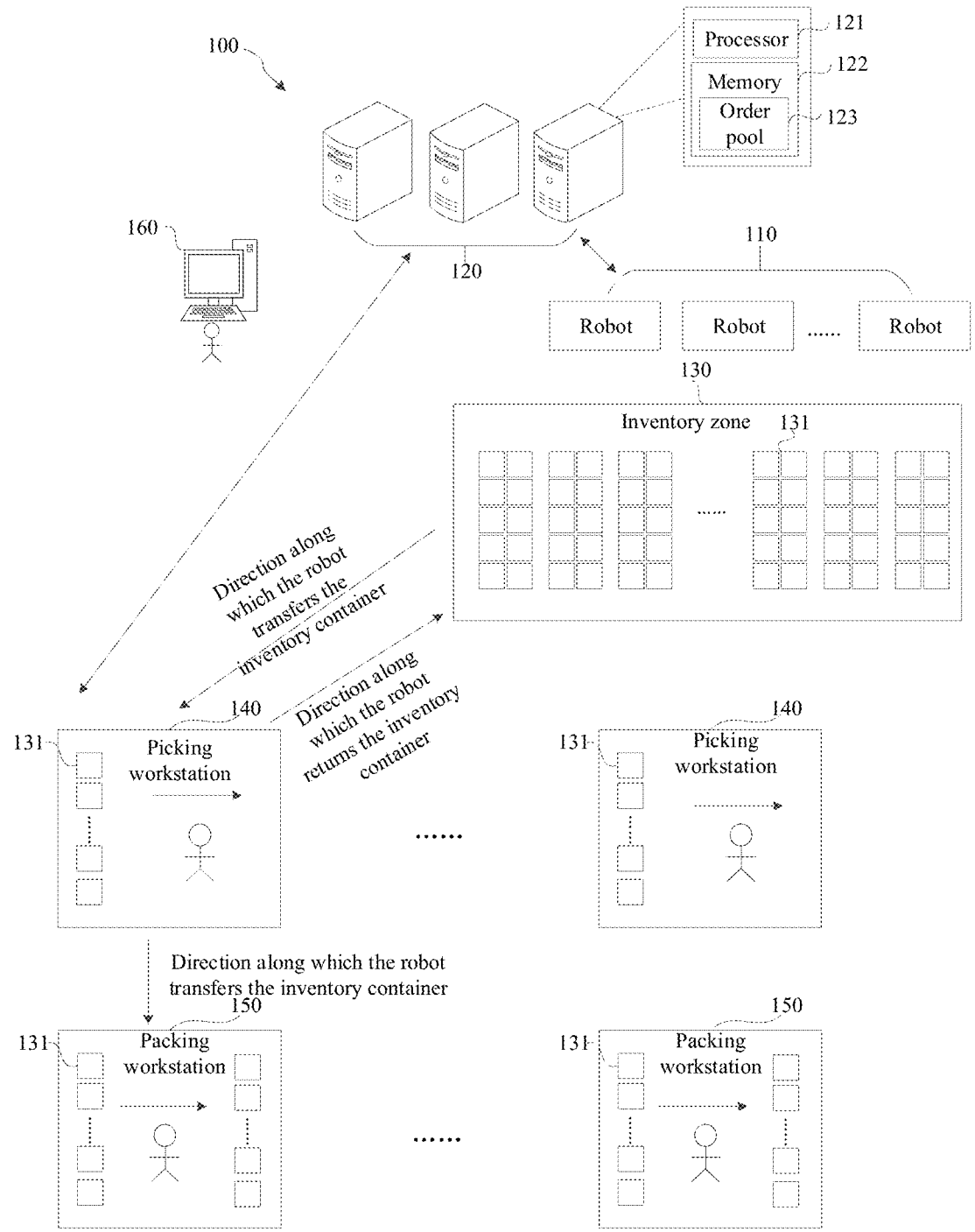
FIG. 1 is a system structure diagram of a picking system for warehousing provided in an embodiment of the present application.

Embodiments of the present application are described below in conjunction with the drawings and embodiments. It may be understood that the specific embodiments described herein are only used for explaining the embodiments of the present application, rather than limiting the present application. In addition, it should be noted that, for convenience of description, only parts related to the embodiments of the present application, instead of the entire structure, are shown in the drawings.

Referring to a system structure diagram of a warehousing picking system shown in FIG. 1, the warehousing picking system 100 includes robots 110, a control system 120, an inventory zone 130 (also called storage zone), picking workstations 140 and packing workstations 150. The inventory zone 130 is provided with a plurality of inventory containers 131 (also called storage containers). Various items are placed on the inventory containers 131, like shelves with various commodities placed thereon as seen in a supermarket, and a plurality of shelves 131 are arranged in an array. The inventory containers 131 may be any kind of containers capable of storing items, such as shelves (in the case where the inventory containers are specifically shelves, the inventory zone is also a shelf zone), and suitable containing means such as bins or pallets that can contain items may be placed on the shelves, or items may be placed directly on the shelves.

Figure 2:
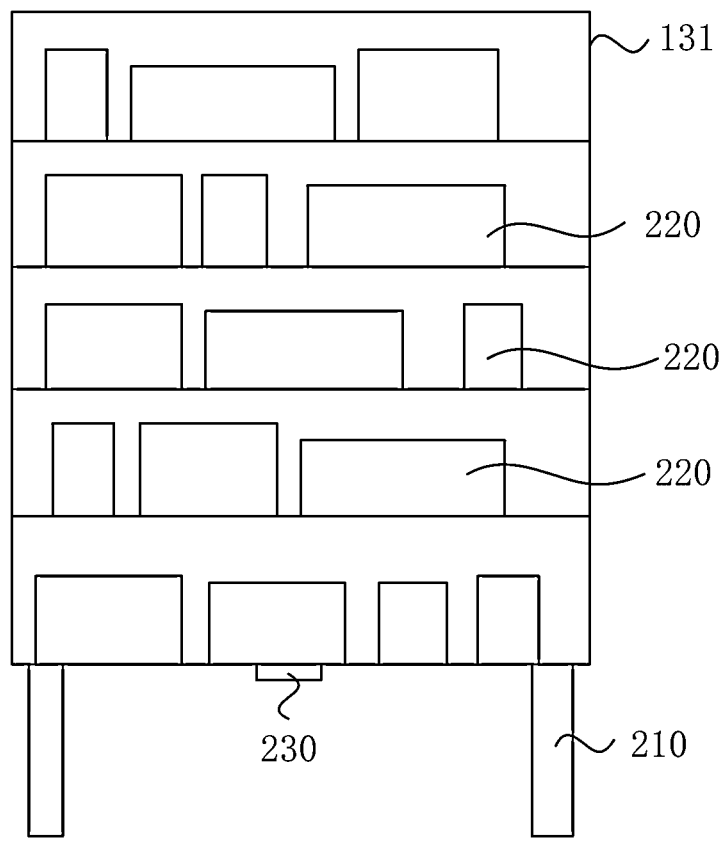
FIG. 2 is a structural diagram of an inventory container provided in an embodiment of the present application.

FIG. 2 is a schematic structural diagram of an inventory container provided in an embodiment of the present application. As shown in FIG. 2, the inventory container 131 includes a plurality of partition layers and four floor-standing support columns 210, and multiple types of items 220 may be placed directly on the partition layers of the inventory container 131. In an embodiment, the items 220 may be suspended by means of hooks or rods in the inventory container 131 or on the inventory container 131, and the items 220 on the inventory container 131 can be placed inside or on an outer surface of the inventory container 131 in any suitable manner.

The partition layers of the inventory container 131 may also be provided with a plurality of bins, which may be separated from the inventory container 131, or integrated with the inventory container 131, and one or more items may be placed in the bins. Furthermore, the inventory container 131 may be an inventory container open on two sides, and two items may be placed along the depth direction of each partition layer, which means that one item is placed in each open direction, or two bins are placed along the depth direction of each partition layer, which means that one bin is placed in each open direction. The inventory container 131 may also be an inventory container open on one side (FIG. 2 shows an inventory container open on one side), and one item may be placed along the depth direction of each partition layer, which means that one item is placed in the open direction, or one bin is placed along the depth direction of each partition layer, which means that one bin is placed in the open direction.

The control system 120 communicates with the robots 110 wirelessly, and a working person uses an operation console 160 to operate the control system 120, and each robot 110 perform a goods transfer task under the control of the control system 120. For example, the control system 120 plans a movement path for the robot 110 according to the transfer task, and the robot 110 may travel along an empty space (a part of a passageway of the robot 110) in the inventory container array according to the movement path. To conveniently plan the movement path for the robot 110, a working area of the robot 110 (the working area includes at least an area where the storage zone 130, the picking workstations 140 and the packing workstations 150 are located) is divided into a plurality of sub-areas (i.e., cells) in advance, and the robot 110 moves on a sub-area basis to form a motion trajectory.

Figure 3:
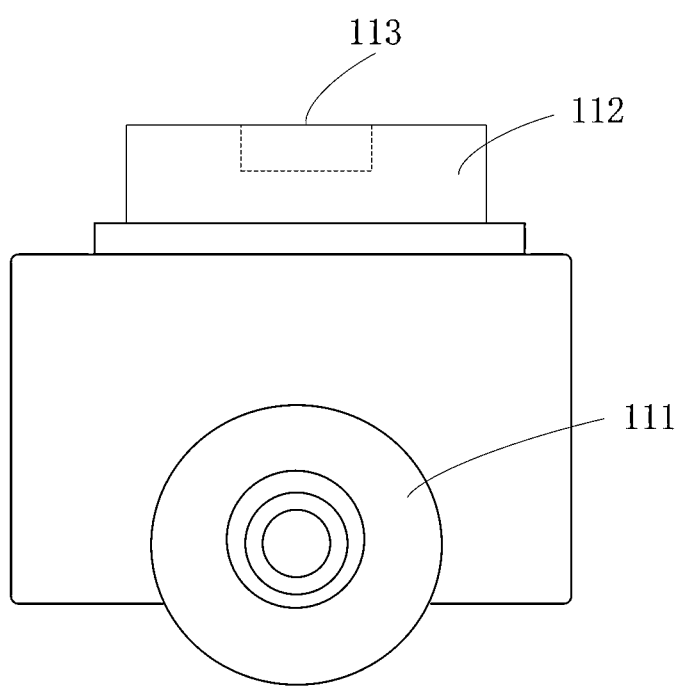
FIG. 3 is a structural diagram of a robot provided in an embodiment of the present application.

The robot may be a picking robot, an intelligent forklift, a stacking robot or a transfer robot. FIG. 3 is a schematic structural diagram of a robot provided in an embodiment of the present application. As shown in FIG. 3, in an example, the robot 110 may include a driving mechanism 111, by means of which the robot 110 can move within a working space. The robot 110 may also include a lifting mechanism 112 configured to transfer an inventory container 131, and the robot 110 may move to the underside of the inventory container 131, lift the inventory container 131 by using the lifting mechanism 112, and transfer it to an allocated picking workstation 140. A working person (or automated equipment such as a robotic arm) at the picking workstation 140 picks an item from the inventory container 131. For an inventory container with two open sides, the robot 110 may rotate the inventory container 131 so that the direction of the open side where the item to be picked is located faces a person who picks the item, such as a working person or automated equipment such as a robotic arm. When the lifting mechanism 112 rises, the entire inventory container 131 is lifted from the ground, so that the robot 110 transfers the inventory container 131, and places the inventory container 131 on the ground when the lifting mechanism 112 falls. An identification component 113 of the robot 110 can effectively identify the inventory container 131 during lifting of the inventory container 131 by the robot 110.

In addition, if it is based on two-dimensional code navigation, the robot 110 further includes a navigation identification component (not shown in FIG. 3), which is configured to identify a two-dimensional code mark provided on the ground. In addition to the two-dimensional code navigation, the robot 110 may also adopt other navigation mode, such as inertial navigation, or simultaneous localization and mapping (SLAM) navigation, or adopt a combination of two or more navigation modes, such as two-dimensional code navigation and inertial navigation, or SLAM navigation and two-dimensional code navigation. Of course, the robot 110 also includes a control module (not shown in FIG. 3) that controls the entire robot 110 to implement functions such as motion and navigation. In an example, the robot 110 at least includes two cameras, one of which faces upward and the other faces downward, and the robot 110 can travel forward according to two-dimensional code information (or other ground identifier) captured by the downward camera, can travel to the underside of the inventory container 131 prompted by the control system 120 according to a path determined by the control system 120.

As shown in FIG. 2, a two-dimensional code 230 is provided at the exact center of the bottom of the inventory container 131. After the robot 110 travels to the underside of the inventory container 131, the upward camera correctly photographs the two-dimensional code 230 to ensure that the robot 110 is just located directly below the inventory container 131, thereby ensuring that the robot 110 can smoothly lift and transfer the inventory container 131.

In this embodiment, the picking workstation 140 is used to pick an item on the inventory container 131 transferred by the robot 110 and place the item into an order container (one order container may hold order items for at least one order), and the packing workstation 150 is used to pack the order items in the order container. The picking workstation 140 and the packing workstation 150 may be a same workstation or different workstations. Automated equipment (e.g., mechanical hand) or a working person performs an item packing process for order items in the order container based on an item packaging and filling method. For example, the robot 110 transfers the order container with the order items stored therein to the packing workstation 150, and then the mechanical hand or working person in the packing workstation 150 may package the order items in the order container.

The control system 120 is a software system running on a server and having data storage and information processing capabilities, and may be connected to an access device, a transfer device, a hardware input system, and other software systems in a wireless or wired manner. The control system 120 may include one or more servers, and may be of a centralized control architecture or a distributed computing architecture. The server has a processor 121 and a memory 122, and an order pool 123 can be provided in the memory 122.

In a traditional warehousing system, after order items are picked based on a "goods-to-person" mode, the order items need to be packaged and shipped. Due to various shapes and properties of items, and various specifications of packaging containers, such as packaging boxes, for packaging items, it is difficult for the packaging containers to perfectly match the items to be packaged. In related technology, a working person usually fill a filling medium such as waste newspaper, inflated bags or foam boards of a matching shape between items and a packaging container, to support the items during transport of the items, thereby preventing the items from being damaged due to shaking. However, a packaging process in the related technology is performed in a manual packaging manner, and in the process of packaging, not only does a working person need to spend time to fill the above-mentioned filling medium, but also the filling medium often needs manual secondary cutting to conform the filling medium to a fillable space, resulting in greatly increased time of the packaging process, and thus affecting the shipment efficiency of the entire warehouse.

An item packaging and filling method provided in an embodiment of the present application is described in detail below through a plurality of embodiments.

Figure 4:
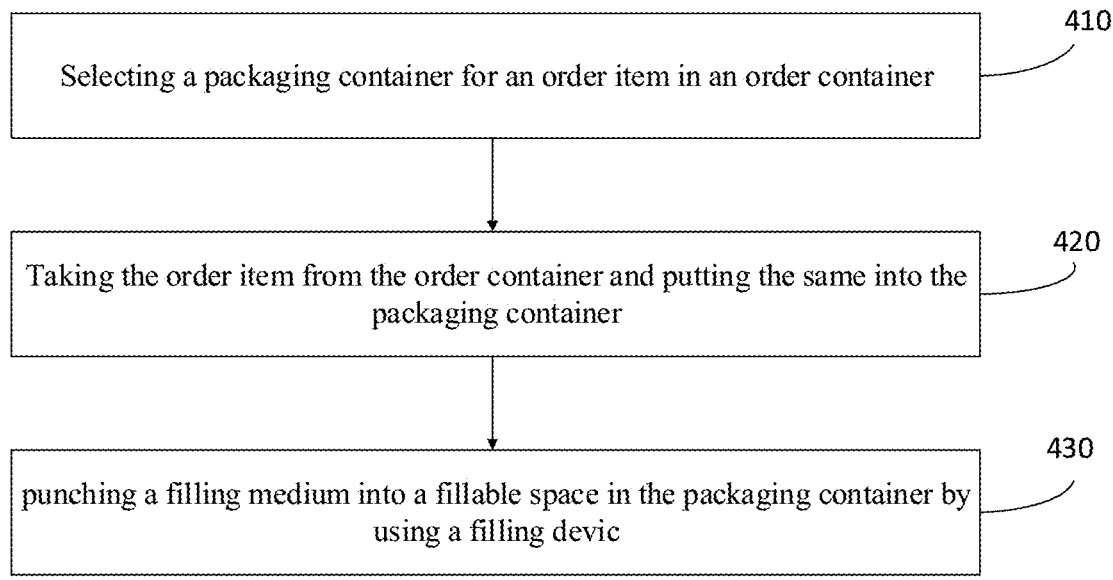
FIG. 4 is a flow diagram of an item packaging and filling method provided in an embodiment of the present application.

FIG. 4 is a flow diagram of an item packaging and filling method provided in an embodiment of the present application. This embodiment may be applied to a scenario of filling a medium into a packaging container with order items placed therein. The method may be performed by automated equipment (e.g., a mechanical hand) or a working person. The method includes:

Step 410: selecting a packaging container for an order item in an order container.

In an embodiment, the order item refers to an item determined to be shipped out after picking in response to an order demand, and may be an item of any type or material. Correspondingly, the order container refers to a storage container determined to be placed with an order item after picking, e.g., the order container may be a bin or other container, and one order container may contain an order item for one or more orders. The packaging container refers to a container for packaging an order item, and may be a packaging box or a packaging bag or other container that can be used to pack an order item, and the material of the packaging container is not limited. It may be understood that the size of the packaging container is not smaller than the size of the order item to ensure that the packaging container can reasonably accommodate the order item to be packaged.

In an embodiment, after the item is picked, a control system or working person may assign a suitable packaging container for the order item based on attribute information of the order item and attribute information of packaging containers in a warehousing system. In this embodiment, the attribute information of the order item may include type, quantity and size information of the item, and may also include weight information and storage mode information of the item; the attribute information of the packaging container may include size information of the container, and may also include load-bearing information and packaging mode information of the item.

Step 420: taking the order item from the order container and putting the same into the packaging container.

In an embodiment, a mechanical hand, robot, or working person may, based on the packaging container selected for the order item, take the order item from the order container and place the same into the corresponding packaging container.

Step 430: punching a filling medium into a fillable space in the packaging container by using a filling device.

In an embodiment, to improve the transport safety of the order item, avoid or reduce shaking of the order item in the packaging container, and improve the packaging efficiency of the order item, the fillable space between the packaging container and the order item in the packaging container is filled with the medium in a pressed manner during packaging of the order item.

Figure 5:
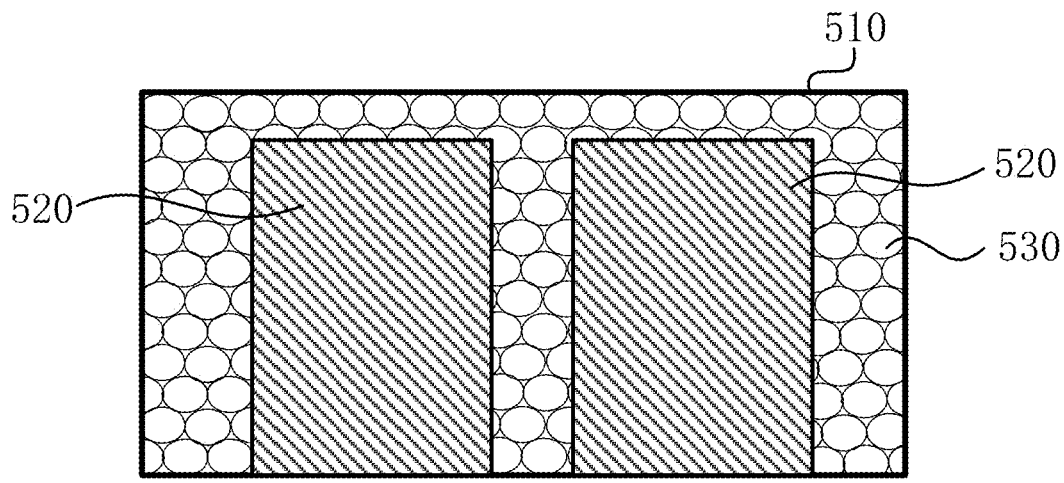
FIG. 5 is a schematic diagram of filling foam in a packaging container provided in an embodiment of the application.

In this embodiment, the filling medium is used to support the contained item and prevent the order item from shaking in the packaging container. The filling medium does not have a defined shape before punched into the fillable space, and may be a substance with fluidity, and capable of forming a space shape consistent with the fillable space after punched into the fillable space, and forming a hard or soft solid under the action of air. In an embodiment, the filling material includes foam or gel. In an embodiment, the gel rapidly solidifies from a liquid form to a solid form after being punched into the fillable space, and the gel in the solid form may be stripped off from an attached object without adversely affecting the attached object such as the order item. Exemplarily, FIG. 5 is a schematic diagram of filling foam in a packaging container provided in an embodiment of the application. As shown in FIG. 5, an item 520 is placed in a packaging container 510, and a fillable space between the packaging container 510 and the item 520 is filled with foam 530, so that the item 520 is supported and protected by the filling of the foam 530.

In this embodiment, the filling device refers to a device that can fill the filling medium in a pressed manner. In an embodiment, the filling device is a filling gun. Exemplarily, the filling gun punches under pressure the filling medium out of a gun muzzle and into the fillable space in the packaging container.

In an embodiment, the filling device may also include a filling medium container, and the filling medium may be stored in the filling medium container in advance, and by pressurizing the filling medium container, the filling medium is pressed into the packaging container by using a filling gun. In an embodiment, the dispensing speed and dispensing pressure of the filling medium may be adjusted through the control of a pressurization unit, so that the filling medium is fit to side walls of the packaging container and surfaces of the order item, and can achieve a supporting function after the filling medium solidifies.

In the technical solution of this embodiment, by selecting a packaging container for an order item in an order container, taking the order item from the order container and putting the same into the packaging container, and punching a filling medium into a fillable space of the packaging container by using a filling device, packaging containers of various specifications or models in which order items are stored may be filled to support and protect the order items in the packaging containers, thus avoiding manual secondary processing of the filling medium in the package filling process, improving the package filling efficiency and applicability, and saving manpower and material costs.

Figure 6:
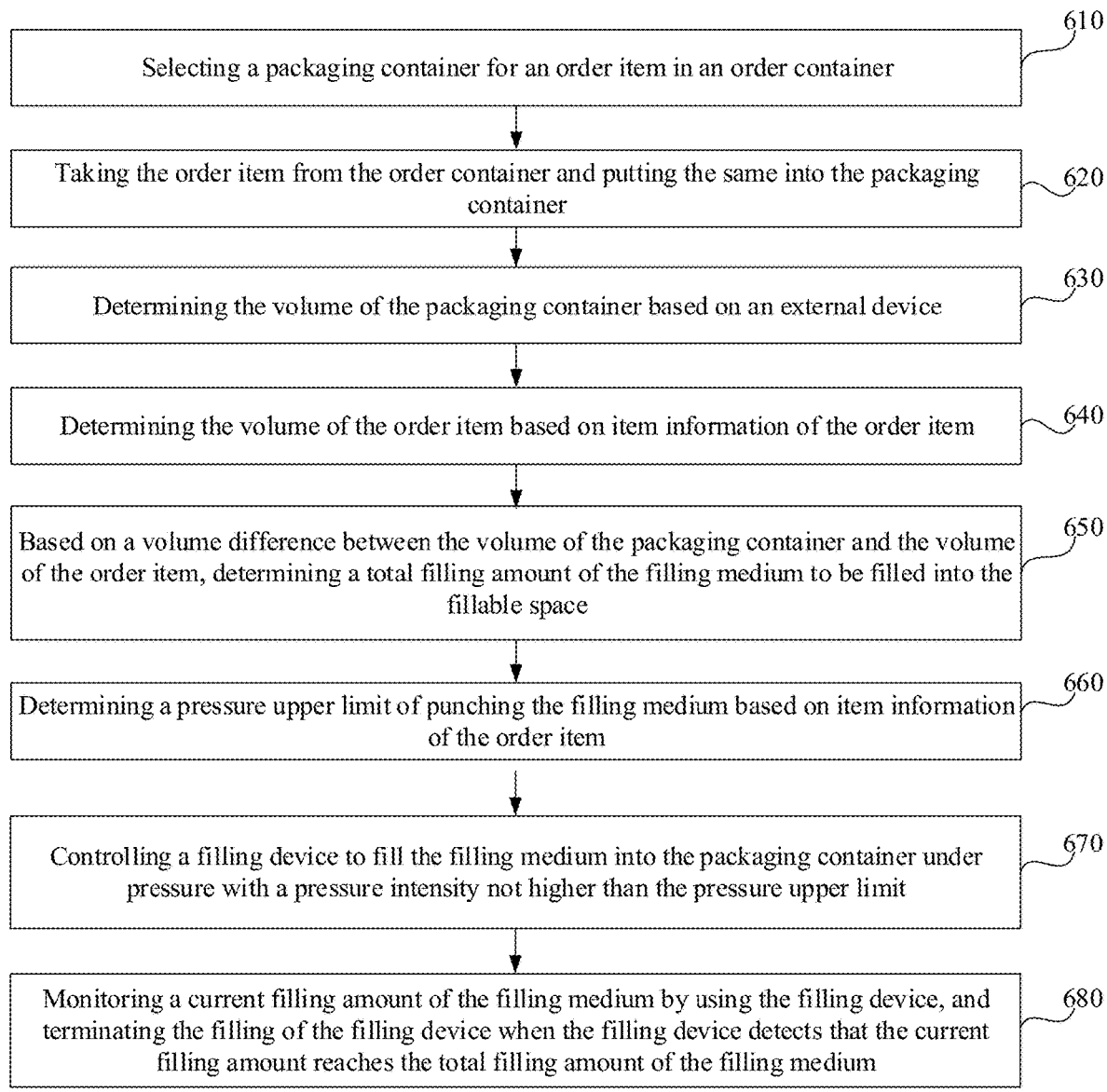
FIG. 6 is a flow diagram of another item packaging and filling method provided in an embodiment of the present application.

This embodiment provides an implementation of the item packaging and filling method based on the above embodiment, so that the intensity of the dispensing pressure of the filling medium can be controlled. FIG. 6 is a flow diagram of an item packaging and filling method provided in an embodiment of the present application. As shown in FIG. 6, the method includes the following steps.

Step 610: selecting a packaging container for an order item in an order container.

Step 620: taking the order item from the order container and putting the same into the packaging container.

Step 630: determining the volume of the packaging container based on an external device.

In an embodiment, the external device is a device capable of detecting or collecting information including the container volume. In an embodiment, the external device may be a depth camera, radar, or depth sensor, and may also be a scanning device or a reading device.

In an embodiment, a depth camera may be used to capture a depth image of the packaging container. The depth image refers to an image acquired by a depth sensor such as a depth camera. Each pixel value in the depth image represents the distance between an object and a camera plane. Thus, volume information of the packaging container in the image may be calculated by measurement using a specific algorithm based on the depth image. A radar or depth sensor may be used to obtain point cloud data of the packaging container to be filled by laser scanning, and thus, volume information of the packaging container to be filled, in the image may be calculated by measurement using a specific algorithm based on the point cloud data. In addition, the packaging container may be provided with a two-dimensional code or other mark including container size information. The two-dimensional code mark includes container size information. A scanning device may be used to scan the two-dimensional code mark on the packaging container to read size information of the packaging container, thereby determining the volume of the container according to the size information. Alternatively, the packaging container may be provided with a radio frequency identification (RFID) tag including container size information, and a radio frequency information reading device may be used to read the RFID tag provided on the packaging container to read size information of the packaging container, thereby determining the volume of the container according to the size information. The above volume detecting method may be used alone or in combination of multiple methods to improve the accuracy of detection.

Exemplarily, a depth image and corresponding point cloud data are obtained by using a Kinect depth sensor, and pre-processing such as enhancement, binarization and target extraction is performed on the depth image to locate the packaging container in the depth image, and the area and height of the packaging container are calculated by counting pixel points and processing the point cloud data, and finally the volume of the packaging container is determined from the area and height.

Step 640: determining the volume of the order item based on item information of the order item.

In an embodiment, before leaving factory, items are usually adhered with two-dimensional code or other barcode information or an RFID tag on the surface, and the barcode information or RFID tag may contain information such as the price, type, material, weight, size or quantity of the item. Thus, by scanning the barcode or reading the RFID tag to obtain item information, the volume of the order item may be quickly calculated. In addition, for an item without a barcode or RFID tag, this embodiment may also use the depth image or point cloud data detecting method to determine the volume of the order item. Given subsequent pressure control of the filling medium, in an embodiment, the barcode or RFID tag is attached to the item before the item is packaged.

Step 650: based on a volume difference between the volume of the packaging container and the volume of the order item, determining a total filling amount of the filling medium to be filled into the fillable space.

In this one embodiment, as the size of the packaging container is not smaller than the size of the order item, the volume of the packaging container is necessarily larger than the volume of the order item. Then, a total filling amount of the filling medium required to fill the packaging container may be determined by calculating a difference between the volume of the packaging container and the volume of the order item.

Step 660: determining a pressure upper limit of punching the filling medium based on item information of the order item.

In an embodiment, the filling medium may be stored in a filling medium container in advance, and by pressurizing the filling medium container, the filling medium is dispensed into the packaging container by using a filling gun. In an embodiment, the dispensing speed and dispensing pressure of the filling medium may be adjusted through the control of a pressurization unit of a filling device, so that the filling medium is fit to side walls of the packaging container and surfaces of the item, and can achieve a supporting function after the filling medium solidifies. For an item made of a soft material, when the item is subjected to a certain amount of pressure, the item will be deformed. For an item made of a hard material, the pressure that such an item can withstand varies. For an item with low toughness or low hardness, when subjected to a certain amount of pressure, the item will be deformed, extruded or even broken.

The pressure upper limit is a maximum pressure that the item can withstand while remaining undeformed or unbroken by pressure. Therefore, in this embodiment, upper limits of a pressure that can be withstood may be pre-set for multiple types of items or multiple types of materials, so that in the process of item package filling, the pressure upper limit in the pressed filling of the medium into the present packaging container may be determined based on the above-mentioned item information read by code scanning.

Step 670: controlling a filling device to fill the filling medium into the packaging container under pressure with a pressure intensity not higher than the pressure upper limit.

In an embodiment, according to the determined pressure upper limit, the pressurization unit of the filling device is controlled to apply a pressure intensity not higher than the pressure upper limit, and the filling device is used to dispense the filling medium from the filling medium container into the packaging container. Then, driven by the pressure, the filling medium gradually flows into the fillable space between the packaging container and the order item, and can achieve a supporting function after solidification and formation.

In an embodiment, a current filling amount of the filling medium is monitored by the filling device; the pressure intensity of punching the filling medium is controlled based on the current filling amount of the filling medium.

In an embodiment, to timely control the filling amount of the filling medium, and avoid filling too little medium resulting in failure to support the contained item, or avoid filling too much medium resulting in failure to seal the packaging container for packing, the flow of the filling medium may be monitored in real time in this embodiment to determine the current filling amount of the filling medium. The current filling amount of the filling medium refers to the volume of the filling medium that has been dispensed into the packaging container at the current time. The current filling amount of the filling medium may be measured by collecting the depth image and/or point cloud data of the packaging container in real time, or determined by displaying a current filling flow in real time on a flow monitoring means provided on the filling gun or filling medium container. Then, the pressure intensity of punching the filling medium is controlled based on the current filling amount of the filling medium.

Exemplarily, ratio thresholds between the current filling amount and a required volume of the filling medium at different pressure intensities may be pre-set. When the current filling amount reaches a ratio threshold, filling is carried out in a depressurization mode associated with a different pressure intensity.

Step 680: monitoring a current filling amount of the filling medium by using the filling device, and terminating the filling of the filling device when the filling device detects that the current filling amount reaches the total filling amount of the filling medium.

In an embodiment, since the filling pressure is controlled by depressurization in advance, when the current filling amount is detected to reach the required volume of the filling medium, the filling is terminated for packing and the packed packaging container is conveyed to a stacking area for subsequent transport.

In the technical solution of this embodiment, first, the volume of a packaging container is determined based on an external device, and the volume of an order item is determined based on item information of the order item, and a total filling amount of the filling medium required to fill the packaging container may be determined by calculating a difference between the volume of the packaging container and the volume of the order item. Second, an upper limit of a punching pressure is determined based on item information of the order item, and the filling medium is filled into the packaging container under pressure with a pressure intensity controlled to be not higher than the pressure upper limit based on a current filling amount. Finally, the current filling amount of the filling medium is detected by a filling device, and the filling is terminated and packing is performed if the current filling amount reaches the total filling amount of the filling medium. In this embodiment, by determining the total filling amount of the filling medium required for the packaging container, and controlling the filling pressure, packaging containers of various specifications or models in which order items are placed can be filled to support and protect the order items in the packaging containers, thereby preventing the order items from being deformed or broken, and avoiding manual secondary processing of the filling medium in the package filling process, improving the package filling efficiency and applicability, and saving manpower and material costs.

Figure 7:
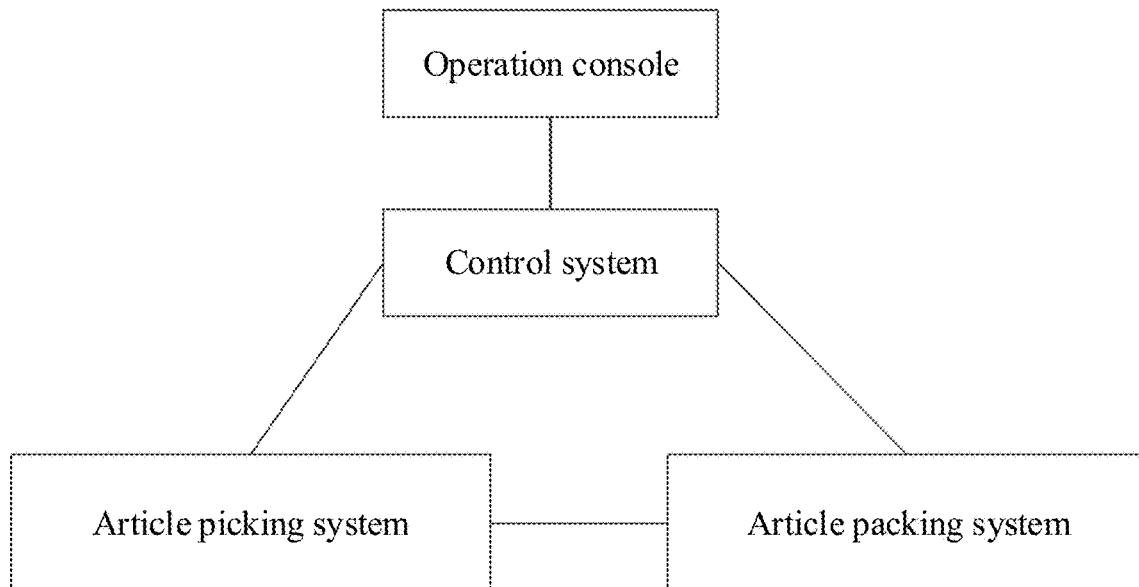
FIG. 7 is a control structure diagram of a warehousing system provided in an embodiment of the present application.

Referring to FIG. 7, which is a block diagram of a control structure of a warehousing system provided in an application embodiment. The control structure of the warehousing system includes an operation console, a control system, an item picking system, and an item packing system.

A working person controls to the control system to work through the operation console, and the control system transmits an instruction to control the item picking system to pick items in a user order in the warehouse, and the packing system packs items according to a packing instruction received from the control system.

In related technology, the item picking system may be partially or completely implemented by mobile robots, while the packing system is implemented by persons. An item stock-out system for warehousing in an embodiment of the present application uses mechanical hands to replace persons, and thus solves the problems that manual packing efficiency is obviously low, resulting in a backlog of goods and slow stock-out of commodities, and affecting warehousing operational efficiency and user experience.

Figure 8A:
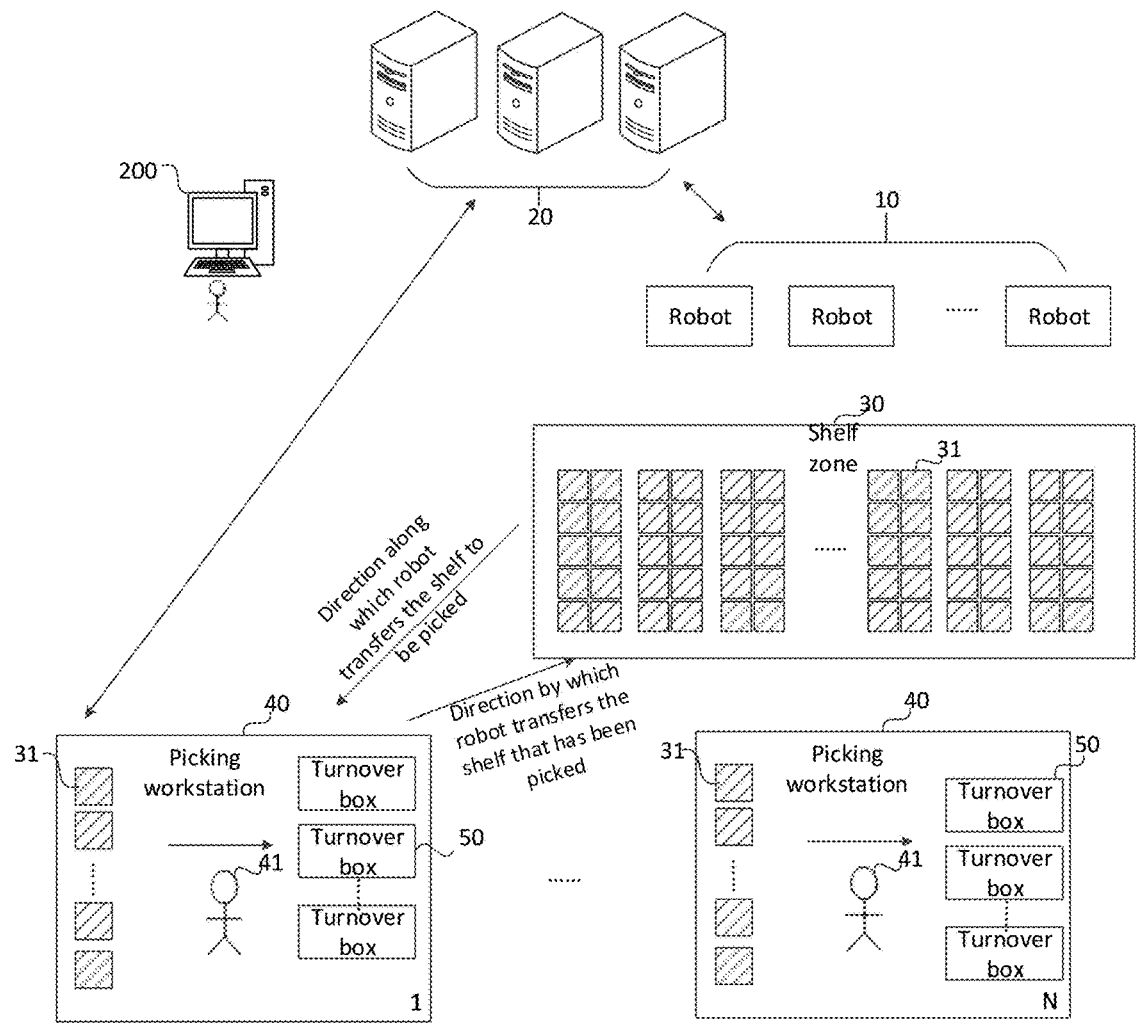
FIG. 8A is a working principle diagram of an item picking system in a warehousing system provided in an embodiment of the present application.

See FIG. 8A, which is a working principle diagram of an item picking system embodiment in a warehousing system provided in an embodiment of the present application.

The item picking system includes mobile robots 10, a server 20, a shelf zone 30, and picking workstations 40. The shelf zone 30 is provided with a plurality of shelves 31, and multiple types of items are placed on the shelves 31, like shelves with multiple types of goods placed thereon as seen in a supermarket for example, and the plurality of shelves 31 are arranged in the form of a shelf array.

A working person uses an operation console 200 to operate the server 20, and the server 20 communicates wirelessly with the mobile robots 10, and the mobile robots 10 perform item transfer tasks under the control of the server 20. For example, a server 20 plans a movement path for a mobile robot 10 according to a transfer task, and the mobile robot 10 travels along an empty space (a part of a passageway of the mobile robot 10) in the array of shelves 31 according to the movement path. To conveniently plan the movement path for the mobile robot 10, a working area of the mobile robot 10 (the working area includes at least an area where the shelf zone 30 and the picking workstations 40 are located) is divided into a plurality of sub-areas (i.e., cells) in advance, and the mobile robot 10 moves on a sub-area basis to form a motion trajectory.

Partition layers of each shelf 31 may be loaded with containers such as bins or pallets. The bins may contain retail items (e.g., tinned cola), and the pallets may have full pallets of stock items (e.g., entire boxes of cola) placed thereon. A mobile robot 10 may transfer the entire shelf 31 to a picking workstation 40 for item picking, or may grab a bin or pallet from the shelf and transfer the bin or pallet to a picking workstation 40 for item picking. Of course, the shelf 31 may also be loaded with bins, pallets or other types of containers in other suitable loading manners, which are all within the protection scope of the present application.

Referring to FIG. 3, using a mobile robot transferring a shelf as an example, the mobile robot 10 may include a driving mechanism 111, through which the mobile robot 10 can move within a working space. The mobile robot 10 may further include a lifting mechanism 112 for transferring a shelf, and the mobile robot 10 may move to the underside of the shelf 31, lift the shelf 31 by using the lifting mechanism 112, and transfer the shelf 31 to an allocated picking station 40. When the lifting mechanism 112 rises, the entire shelf 31 is lifted from the ground, so that the mobile robot 10 transfers the shelf 31, and when the lifting mechanism 112 falls, the shelf 31 is placed onto the ground. An identification component 113 of the mobile robot 10 can effectively identify the shelf 31 during lifting of the shelf 31 by the mobile robot 10.

In addition, if it is based on two-dimensional code navigation, the mobile robot 10 further includes a navigation identification component (not shown in FIG. 3), which is configured to identify a two-dimensional code mark provided on the ground. In addition to the two-dimensional code navigation, the mobile robot 10 may also adopt other navigation mode, such as inertial navigation, or SLAM navigation, or adopt a combination of two or more navigation modes, such as two-dimensional code navigation and inertial navigation, or SLAM navigation and two-dimensional code navigation. Of course, the mobile robot 10 also includes a control module (not shown in FIG. 3) that controls the entire mobile robot 10 to implement functions such as motion and navigation. In an example, the mobile robot 10 at least includes two cameras, one of which faces upward and the other faces downward, and the mobile robot 10 can travel forward according to two-dimensional code information (or other ground identifier) captured by the downward camera, can travel to the underside of a shelf 31 prompted by a server 20 according to a path determined by the server 20.

As shown in FIG. 2, items 220 are stored on an inventory container 131. Of course, the items 220 may also be stored in containing means such as bins or pallets. In an embodiment, the inventory container 131 includes a plurality of partition layers stacked vertically, each capable of containing a plurality of items 220. A two-dimensional code 230 is provided at the exact center of the bottom of the inventory container 131. After the mobile robot 10 travels to the underside of the inventory container 131, the upward camera correctly photographs the two-dimensional code 230 to ensure that the mobile robot 10 is just located directly below the inventory container 131, thereby ensuring that the mobile robot 10 can smoothly lift and transfer the inventory container 131. The inventory container 131 includes one or more support parts 210. In addition, in an embodiment, the items 220 may also be suspended by means of hooks or rods in the inventory container 131 or on the inventory container 131. The items 220 on the inventory container 131 can be placed inside or on an outer surface of the inventory container 131 in any suitable manner.

Figure 8B:
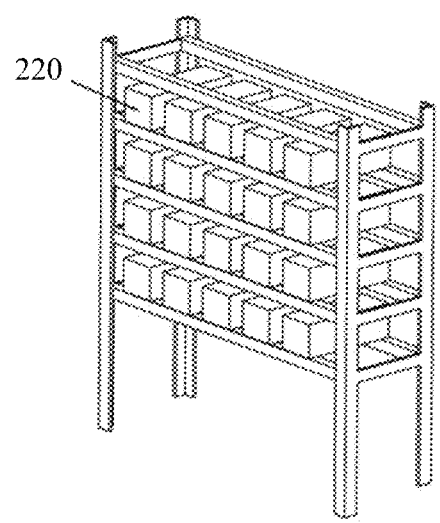
FIG. 8B is a structural diagram of a turnover box on a pick-and-put wall in an item picking system provided in an embodiment of the present application.

The mobile robot 10 transfers the inventory container 131 to a picking workstation 40, and a picking person 41 or a picking device (such as a mechanical arm) at the picking workstation 40 picks items from the inventory container 131 and puts the items into a turnover box 50 on a put wall to wait for packing, as shown in FIG. 8B.

Figure 9:
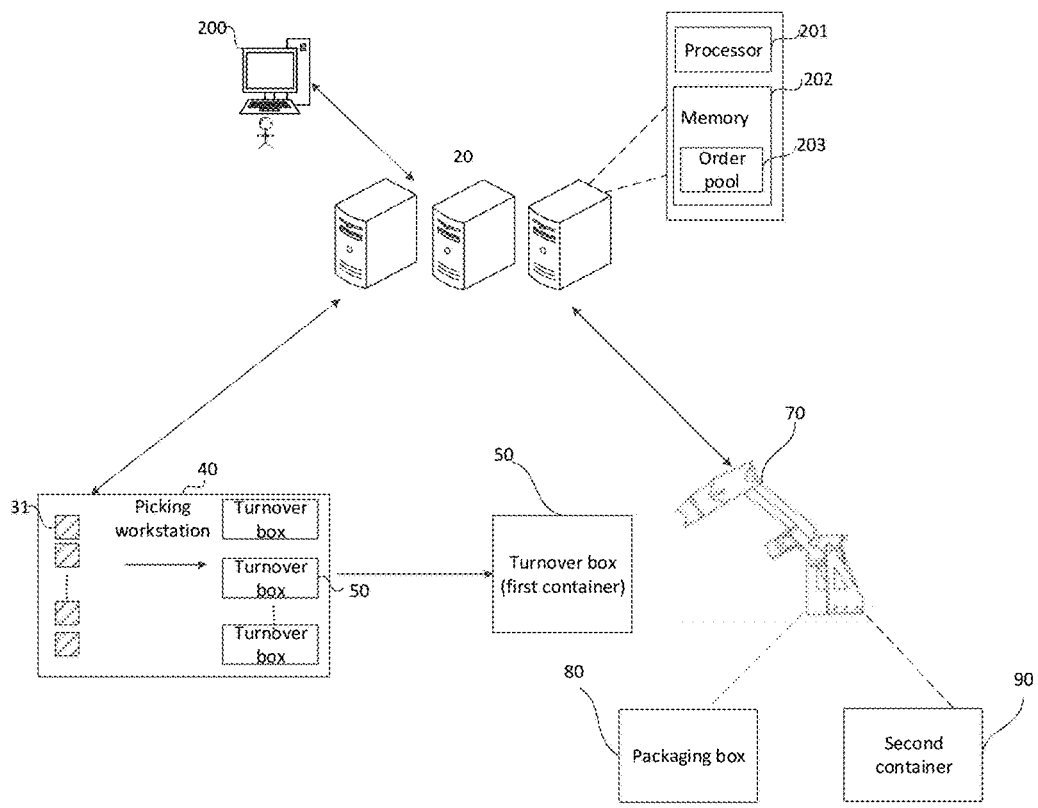
FIG. 9 is a working principle diagram of an item packing system for warehousing provided in an embodiment of the present application.

See FIG. 9, which is a working principle diagram of an item packing system for warehousing provided in an embodiment of the present application.

The item packing system for warehousing in this embodiment includes: first containers 50 (i.e., turnover boxes), a second container 90, a packaging box 80, a mechanical arm 70, and a server 20.

In this embodiment, the first containers 50 are used to accommodate items in user orders. The first containers here are turnover boxes in the picking workstation 40. The first containers 50 are located on a put wall, which includes a plurality of compartments, each of which may carry a first container 50.

There may also be an indicator light below each compartment correspondingly. For a certain compartment in a fixed pick-and-put wall, after all items of an order have been picked, a picking person or picking device switches the indicator light from on to off, indicating that the first container 50 (turnover box) in the compartment may be turned over to a packing work space to pack the items.

For a mobile pick-and-put wall, for example, the mobile pick-and-put wall itself may have first containers 50, and after indicator lights below all compartments are switched from on to off, the mobile pick-and-put wall together with the first containers 50 may be moved to a packaging work space.

In an example, the mobile pick-and-put wall may be moved manually to the packaging work space, and four legs of the mobile pick-and-put wall may be provided with rollers to facilitate movement of the pick-and-put wall. As an alternative, the mobile pick-and-put wall may also be transferred by a mobile robot to the packaging work space.

In an embodiment, each first container 50 may accommodate items for one user order or items for a plurality of user orders, and the accommodating space of the first container is determined by a server 20, depending on the number of items in the order.

The server 20 is configured to generate a packing instruction based on a user order and transmit the packing instruction to the mechanical arm, wherein the packing instruction include a packing record of the order, and the packing record includes IDs of items and a corresponding packaging sequence of the items.

The server 20 is a software system running on a server and having data storage and information processing capabilities, and may be connected to a robot, a hardware input system, and other software systems in a wireless or wired manner. The server 20 may include one or more servers, and may be a centralized control architecture or a distributed computing architecture. The server has a processor 201 and a memory 202, and an order pool 203 may be provided in the memory 202.

The mechanical arm 70 is configured to receive a packing instruction, and grab the items stored in the first container 50 in sequence according to the IDs of the items and the packaging sequence, and if a currently grabbed item is an item of a current packaging sequence indicated by the packing record, put the item into a packaging box 80, and if the currently grabbed item is not an item in the current packaging sequence indicated by the packing record, put the item into a second container 90.

Figure 10A:
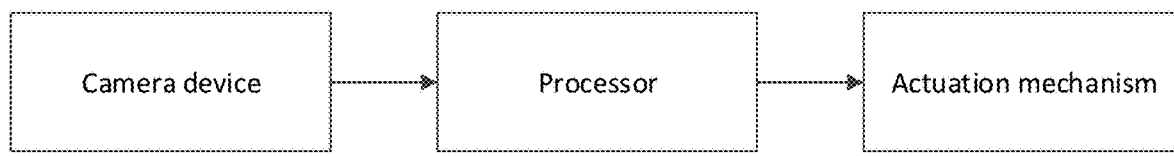
FIG. 10A is a structural block diagram of a mechanical arm in an item packing system for warehousing provided in an embodiment of the present application.

In an embodiment, a structural block diagram of the mechanical arm may be shown in FIG. 10A, the mechanical arm including a camera device, a processor, and an actuation mechanism, wherein the camera device is configured to photograph an item grabbed by the actuation mechanism; the processor is configured to identify the photographed item, and transmit a first drive signal if the identified item is an item corresponding to the sequence indicated by the packing record, and transmit a second drive signal if the identified item is an intermediate item; and the actuation mechanism is configured to grab an item from the first container, and put the item into the packaging box when receiving the first drive signal, and put the item into the second container when receiving the second drive signal.

Figure 10B:
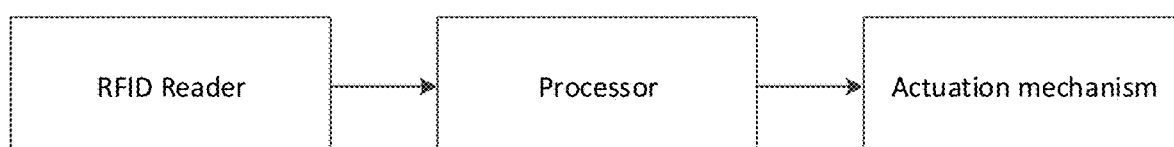
FIG. 10B is a structural block diagram of another mechanical arm in an item packing system for warehousing provided in an embodiment of the present application.

In another embodiment, a structural block diagram of the mechanical arm may be shown in FIG. 10B, the mechanical arm including an RFID reader, a processor and an actuation mechanism, wherein the RFID reader is configured to scan an electronic tag of an item grabbed by the actuation mechanism; the processor is configured to identify the scanned item, and transmit a first drive signal if the identified item is an item corresponding to the sequence indicated by the packing record, and transmit a second drive signal if the identified item is an intermediate item; and the actuation mechanism is configured to grab an item from the first container, and place the item into the packaging box when receiving the first drive signal, and place the item into the second container when receiving the second drive signal.

Figure 11:
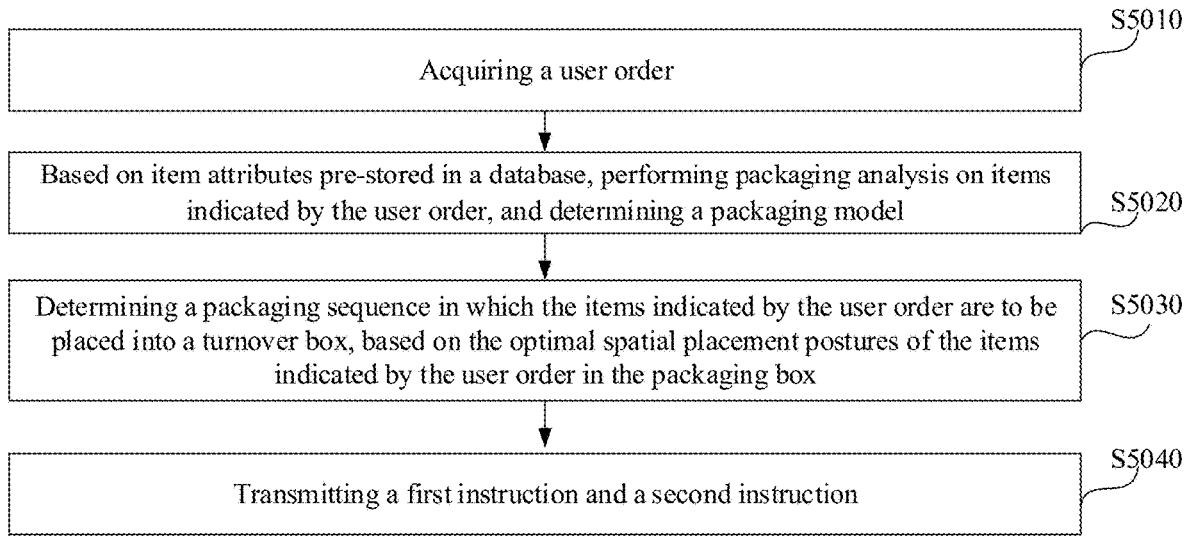
FIG. 11 is a flow diagram of an item packaging method provided in an embodiment of the present application.

See FIG. 11, which is a flow diagram of an item packaging method provided in an embodiment of the present application. In an embodiment, the method includes the following steps.

S5010: acquiring a user order.

The demand for an item is usually embodied in the form of an order. For example, the sum of items purchased by a user on a shopping platform may be represented by one or more orders. To increase efficiency, all orders for item demands are aggregated on a server (e.g., a dispatch server). Orders for one or more different users may be obtained by making relevant queries to the server.

S5020: based on item attributes pre-stored in a database, performing packaging analysis on items indicated by the user order, and determining a packaging model.

A user order usually contains one or more items, and the one or more items corresponding to the order need to be packaged in a packaging box. To improve the use efficiency of the packaging box and achieve a minimum volume of the packaging box for the items corresponding to the order, it needs to determine an arrangement sequence of the items in the packaging box to form a packaging model, the packaging model including a packaging sequence of the items in the user order. Furthermore, the packaging model defines spatial placement postures of the items indicated by the user order in the packaging box. In an embodiment, the postures include placement positions and/or angles of the items.

S5030: determining a packaging sequence in which the items indicated by the user order are to be placed into a turnover box, based on the optimal spatial placement postures of the items indicated by the user order in the packaging box.

Since each item has a specific placement posture in the packaging box, the sequence of the items in the turnover box can be determined correspondingly based on the posture. For example, an item placed first in the packaging box is set to be placed last in the turnover box. The placement angles of the items in the packaging box are same as the placement angles of the items in the turnover box. In this way as described above, the items may be moved from the order box to the turnover box in a reverse sequence without changing the placement angles of the items, thus improving the item moving efficiency.

S5040: transmitting a first instruction and a second instruction.

After the packaging model is determined, at least 2 steps are needed to complete the packaging task. First, the items need to be acquired from a shelf of the warehouse in a sequence corresponding to the packaging sequence. Then, the acquired items are automatically packed by a packaging robot (e.g., a mechanical arm). For the two steps, the server generates a first instruction and a second instruction. The first instruction is used to instruct a picking robot to select items based on the packaging sequence and placing selected items into the turnover box. The second instruction is used to instruct a packaging robot to move the items in the turnover box to the packaging box in sequence.

The packaging operation of the items into the packaging box may be implemented in a variety of ways. In one picking mode, the picking robot is an item-picking robot, which may pick items directly and put the picked items into the turnover box; and in the other picking mode, the picking robot is a normal shelf-picking robot, in which case the picking robot transfers a shelf to a workstation, and then a working person picks goods from the shelf and puts the picked items into the turnover box.

In addition to the packaging sequence, a packaging module may also have other attributes. In an embodiment, the second instruction is configured to instruct the packaging robot to move the items in the turnover box to the packaging box in sequence according to the optimal spatial placement postures. By setting space attributes, the arrangement manner of the items in the turnover box is further guaranteed.

Different items are usually of different sizes and types. In an embodiment, the packaging model further defines packaging box information, the packaging box information including the number of packaging box(s) required for the items indicated by the user order and at least one of: the size and type of the packaging box required for the items indicated by the user order.

In addition, the method further includes: matching a packaging box for the items indicated by the user order according to the packaging box information; and transmitting a third instruction, the third instruction being used to instruct a transfer robot to transfer the matched packaging box to perform a packaging operation by the packaging robot.

To further ensure that the items in the same packaging box can have better compatibility, in an embodiment, the item attributes include at least one of: item category, geometric parameter, insulation required, no insulation, fragile, non-fragile, pressure resistance, and non-pressure resistance.

Figure 12:
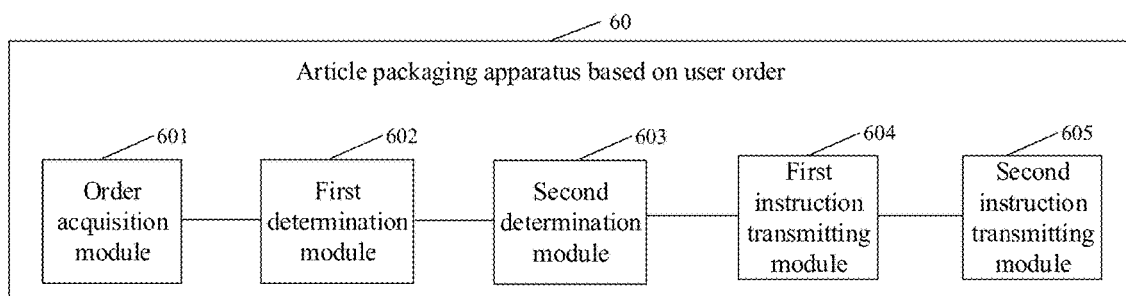
FIG. 12 is a structural diagram of an item packaging apparatus provided in an embodiment of the present application.

See FIG. 12, which is a structural diagram of an item packaging apparatus provided in an embodiment of the present application. Referring to FIG. 12, the item packaging apparatus 60 provided in this embodiment includes the following modules.

An order acquisition module 601 is configured to acquire a user order.

The demand for an item is usually embodied in the form of an order. For example, the sum of items purchased by a user on a shopping platform may be represented by one or more orders. To increase efficiency, all orders for item demands are aggregated on a server (e.g., a dispatch server). Orders for one or more different users may be obtained by making relevant queries to the server.

A first determination module 602 is configured to, based on item attributes pre-stored in a database, perform packaging analysis on items indicated by the user order, and determine a packaging model.

A user order usually contains one or more items, and the one or more items corresponding to the order need to be packaged in a packaging box. To improve the use efficiency of the packaging box and achieve a minimum volume of the packaging box for the items corresponding to the order, it needs to determine an arrangement sequence of the items in the packaging box to form a packaging model, the packaging model including a packaging sequence of the items in the user order. Furthermore, the packaging model defines spatial placement postures of the items indicated by the user order in the packaging box. In an embodiment, the postures include placement positions and/or angles of the items.

A second determination module 603 is configured to determine a packaging sequence in which the items indicated by the user order are to be placed into a turnover box, based on the optimal spatial placement postures of the items indicated by the user order in the packaging box.

Since each item has a specific placement posture in the packaging box, the sequence of the items in the turnover box can be determined correspondingly based on the posture.

For example, an item placed first in the packaging box is set to be placed last in the turnover box. The placement angles of the items in the packaging box are same as the placement angles of the items in the turnover box. In this way as described above, the items may be moved from the order box to the turnover box in a reverse sequence without changing the placement angles of the items, thus improving the item moving efficiency.

A first instruction transmitting module 604 is configured to transmit a first instruction, which instructs a picking robot to select items based on the packaging sequence and place the selected items into the turnover box.

A second instruction transmitting module 605 is configured to transmit a second instruction, which instructs a packaging robot to move the items in the turnover box to the packaging box in sequence.

After the packaging model is determined, at least 2 steps are needed to complete the packaging task. First, the items need to be acquired from shelves of the warehouse in a sequence corresponding to the packaging sequence. Then, the acquired items are automatically packed by a packaging robot (e.g., a mechanical arm). A first instruction transmitting module 603 is configured to transmit a first instruction, the first instruction being used to instruct a picking robot to select items based on the packaging sequence and place the selected items into the turnover box. A second instruction transmitting module 604 is configured to transmit a second instruction, the second instruction being used to instruct a packaging robot to move the items in the turnover box to the packaging box in sequence.

In an embodiment, the second instruction is configured to instruct the packaging robot to move the items in the turnover box to the packaging box in sequence according to the optimal spatial placement postures.

In an embodiment, the packaging model further defines packaging box information, the packaging box information including the number of packaging box(s) required for the items indicated by the user order and at least one of: the size and type of the packaging box required for the items indicated by the user order.

In an embodiment, the apparatus further includes: a packaging box matching module configure to match a packaging box for the items indicated by the user order according to the packaging box information; and a third instruction transmitting module configured to transmit a third instruction, the third instruction being used to instruct a transfer robot to transfer the matched packaging box to perform a packaging operation by the packaging robot.

In an embodiment, the item attributes include at least one of: item category, geometric parameter, insulation required, no insulation, fragile, non-fragile, pressure resistance, and non-pressure resistance.

Corresponding to the above method embodiment, an embodiment of the present application further provides a control system, which includes: at least one processor; and a memory communicably connected with the at least one processor, wherein the memory stores instructions executable by the at least one processor, and the instructions are executed by the at least one processor to cause the at least one processor to execute the solution of the above method embodiment.

Figure 13:
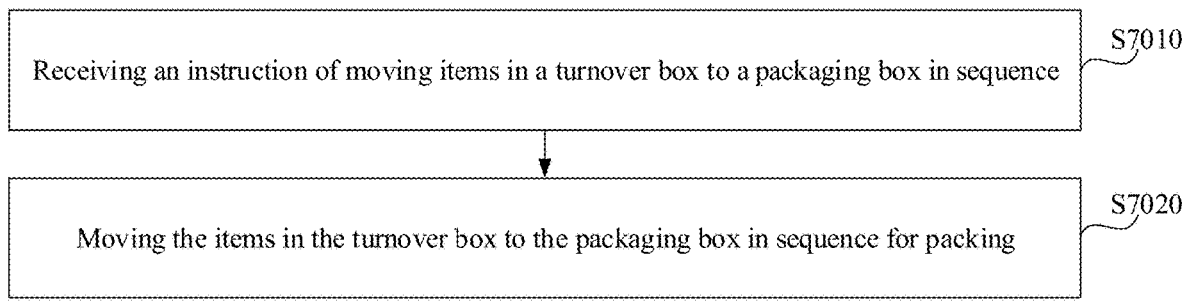
FIG. 13 is a flow diagram of an item packaging method provided in an embodiment of the present application.

Corresponding to the method embodiment running on the server in FIG. 11, referring to FIG. 13, which shows a flow diagram of an item packaging method provided in an embodiment of the present application, the method may run in a client corresponding to the server, the method including the following steps.

S7010: receiving an instruction of moving items in a turnover box to a packaging box in sequence.

After the server determines a packaging model, a packaging robot configured to perform a packing task may perform a packaging operation based on the packaging model. The packaging robot may communicate with the server, and is configured to receive an instruction of moving items in a turnover box to a packaging box in sequence.

S7020: moving the items in the turnover box to the packaging box in sequence for packing.

The items in the turnover box are obtained in such a manner that: a picking robot picks items according to a packaging sequence of items indicated by a packaging model, and places the picked items into the turnover box; and the packaging sequence is determined after analyzing received item attributes indicated by the user order by a control system.

In an embodiment, the instruction of moving items in a turnover box to a packaging box in sequence further includes spatial placement postures of the items indicated by the user order in the packaging box, determined according to the item attributes; and moving the items in the turnover box to the packaging box in sequence for packing includes: moving the items in the turnover box to the packaging box in sequence according to the spatial placement postures of the items in the packaging box indicated by the instruction.

In an embodiment, moving the items in the turnover box to the packaging box in sequence for packing includes: identifying an ID of an item taken from the turnover box, determining whether the ID of the item exists in the instruction, and placing the item into the packaging box for packing according to the spatial placement posture of the item in the packaging box in response to existence of the ID of the item in the instruction; and transmitting an error prompt to the control system in response to non-existence of the ID of the item in the instruction.

In an embodiment, after moving the items in the turnover box to the packaging box in sequence for packing, the method further includes: feeding packing completion information back to the control system or a local packing queue controller and waiting for a new packaging task.

Figure 14:
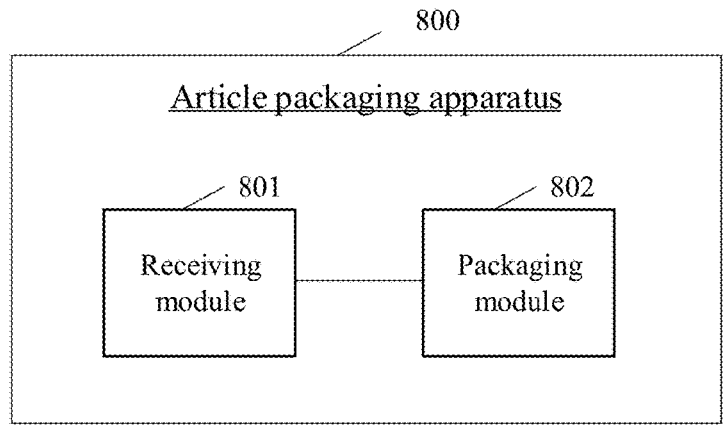
FIG. 14 is a structural diagram of another item packaging apparatus provided in an embodiment of the present application.

See FIG. 14, which is a structural diagram of another item packaging apparatus provided in an embodiment of the present application The item packaging apparatus 800 provided in this embodiment includes the following modules.

A receiving module 801 is configured to receive an instruction of moving items in a turnover box to a packaging box in sequence.

After the server determines a packaging model, a packaging robot configured to perform a packing task may perform a packaging operation based on the packaging model. The packaging robot may communicate with the server, and is configured to receive an instruction of moving items in a turnover box to a packaging box in sequence.

A packaging module 802 is configured to move the items in the turnover box to the packaging box in sequence for packing.

In this embodiment, the items in the turnover box are obtained in such a manner that: a picking robot picks items according to a packaging sequence of items indicated by a packaging model, and places the picked items into the turnover box; and the packaging sequence is determined after analyzing received item attributes indicated by the user order by a control system.

Corresponding to the method embodiment in FIG. 13, an embodiment of the present application further provides a packaging robot, which includes: at least one processor; and a memory communicably connected with the at least one processor, wherein the memory stores instructions executable by the at least one processor, and the instructions are executed by the at least one processor to cause the at least one processor to execute the item packaging method related to FIG. 13.

In addition, an embodiment of the present application provides an item stock-out system for warehousing, the system including a control system, at least one picking robot and at least one packaging robot, wherein the control system is configured to analyze items indicated by an acquired user order based on item attributes pre-stored in a database, determine a packaging model including an item packaging sequence, and transmit a first instruction and a second instruction according to the packaging model.

The picking robot is configured to receive the first instruction, and picks items based on the packaging sequence and places the picked items into the turnover box, according to the first instruction.

the packaging robot is configured to receive the second instruction, and move the items in the turnover box to a packaging box in sequence.

Figure 15:
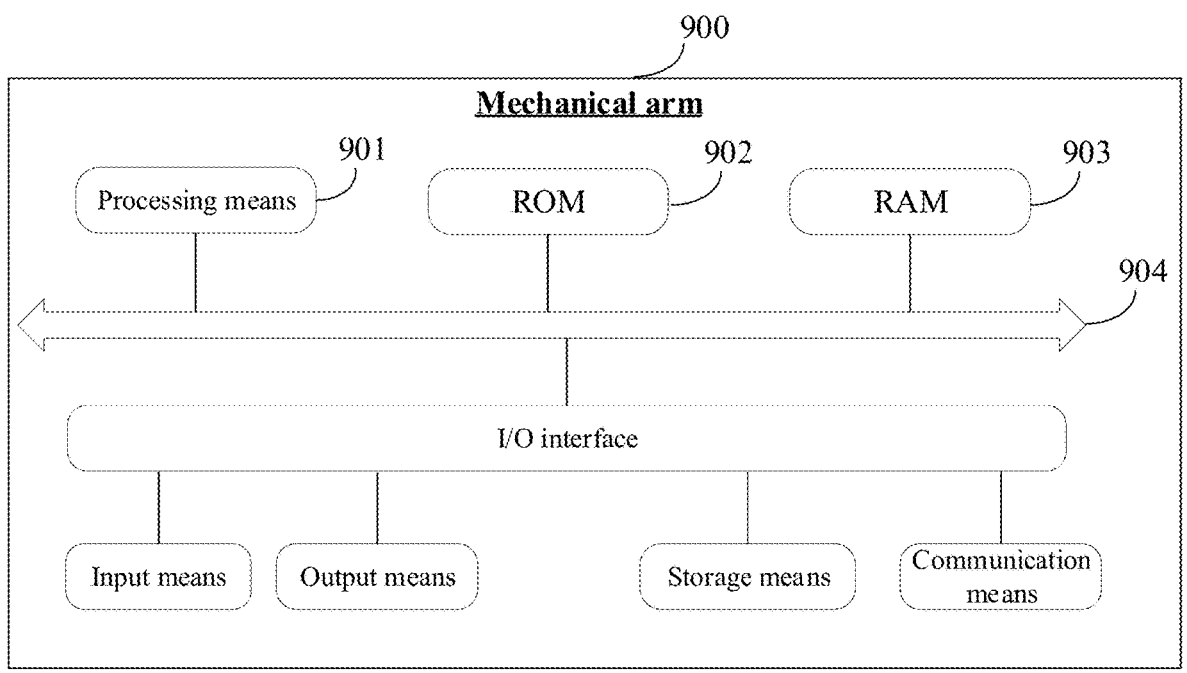
FIG. 15 is a structural block diagram of a control portion of a mechanical arm provided in an embodiment of the present application.

FIG. 15 shows a structural diagram of a control portion in a mechanical arm 900 provided in an embodiment of the present application, the mechanical arm 900 including at least one processor 901 (e.g., central processing unit (CPU)), at least one input/output interface 904, a memory 902, and at least one communication bus 903 configured to implement connection and communication between these components. The at least one processor 901 is configured to execute computer instructions stored in the memory 902 to enable the at least one processor 901 to execute an embodiment of any of the foregoing methods. The memory 902 is a non-transitory memory, and the non-transitory memory may include a volatile memory, such as a high-speed random access memory (RAM), or may include a non-volatile memory, such as at least one disc memory. Communication and connection with at least one other device or unit is achieved through the at least one input/output interface 904 (which may be a wired or wireless communication interface).

In some implementations, the memory 902 stores a program, and the processor 901 executes the program, and is configured to perform operations of any of the above embodiments of item packing for warehousing.

It should be noted that relational terms such as first and second herein are only used to distinguish one entity or operation from another entity or operation, and do not necessarily require or imply there is any such actual relationship or sequence between the entities or operations. Moreover, the terms "comprise", "include" or any other variations thereof are intended to encompass non-exclusive inclusion, such that a process, method, item or device that comprises a series of elements comprises not only those elements, but also other elements not explicitly listed, or elements inherent to such a process, method, item or device. Without more restrictions, elements defined by the wording "comprising a . . . " do not exclude the presence of other identical elements in the process, method, item or device including the elements.

Multiple embodiments in the specification are described in a related manner. For the same and similar parts between the embodiments, reference may be made to each other. Each embodiment focuses on differences from other embodiments. For example, an apparatus embodiment, which is substantially similar to a method embodiment, is described relatively simply, and for its relevant parts, reference may be made to parts of description of the method embodiment.

Logic and/or steps represented in a flow diagram or otherwise described herein, for example, can be regarded as a sequenced list of executable instructions for implementing a logical function, and can be embodied in any computer-readable medium, for use by or in combination with an instruction execution system, apparatus or device (such as a computer-based system, a system including a processor, or other system that can acquire and execute instructions from an instruction execution system, apparatus or device). For the specification, a "computer-readable medium" may be any apparatus that may contain, store, communicate, propagate or transmit a program for use by or in combination with an instruction execution system, apparatus or device. Examples (a non-exhaustive list) of the computer-readable medium include: an electrical connection part (electronic apparatus) with one or more wires, a portable computer disc cartridge (a magnetic apparatus), an RAM, an ROM, an erasable programmable read only memory (EPROM) or flash memory, an optical fiber apparatus, and a portable compact disc read-only memory (CD-ROM). In addition, the computer-readable medium may even be paper or other suitable medium on which a program may be printed, because, for example, the paper or other medium may be optically scanned, and then editing, interpretation or other suitable processing when necessary is performed to obtain the program electronically, which is then stored in a computer memory. It should be understood that multiple parts of the present application may be embodied in hardware, software, firmware, or a combination thereof.

In the above implementations, multiple steps or methods may be embodied in software or firmware stored in a memory and executed by a suitable instruction execution system. For example, if they are embodied in hardware, as in another implementation, they may be embodied by any one or a combination of the following techniques known in the art: a discrete logic circuit with a logic gate circuit for implementing a logic function of a data signal, an application specific integrated circuit with an appropriate combinational logic gate circuit, a programmable gate array (PGA), a field-programmable gate array (FPGA) etc.

What is claimed is:

1. An items packaging method, comprising:
acquiring a user order of items;
performing packaging analysis on the items indicated by the user order, based on attributes of said items pre-stored in a database, and determining a packaging model, wherein the packaging model defines a spatial placement posture of the items indicated by the user order in a packaging box;
determining a packaging sequence in which the items indicated by the userorder are to be placed into a turnover box located on a put wall, based on the spatial placement posture of the items indicated by the user order in the packaging box;
transmitting a first instruction to a picking robot to repeatedly pick items indicated by the user order based on the packaging sequence and to place the picked items into the turnover box until the turnover box is filled with the items indicated by the user order;
moving the put wall on which the filled turnover box is located to a packing work space; and
transmitting a second instruction to a packaging robot to move the items indicated by the user order from the filled turnover box, located at the packing work space, and place the items indicated by the user order successively into the packaging box.

2. The method according to claim 1, wherein the second instruction is further configured to instruct the packaging robot to move the items in the turnover box to the packaging box successively according to the spatial placement posture.

3. The method according to claim 2, wherein the packaging model further defines packaging box information, the packaging box information comprising a quantity of packaging boxes required for the items indicated by the userorder and at least one of: a size and type of the packaging box required for the items indicated by the user order.

4. The method according to claim 3, further comprising:
matching a packaging box for the items indicated by the user order according to the packaging box information; and
transmitting a third instruction, the third instruction being used to instruct a transfer robot to transfer the matched packaging box to allow the packaging robot to perform a packaging operation.

5. An items packaging system, comprising:
a control system, at least one picking robot and at least one packaging robot, wherein the control system is configured to:
receive a user order of the items;
analyze the items indicated by the user order of the items based on attributes of said items pre-stored in a database;
determine a packaging model, wherein the packaging model defines a spatial placement posture of the items indicated by the user order in a packaging box and an item packaging sequence in which the items indicated by the user order are to be placed in a turnover box located on a put wall, based on the spatial placement posture of the items indicated by the user order in the packaging box, and
transmit a first instruction to the at least one picking robot and a second instruction to the at least one packaging robot according to the packaging model;
the at least one picking robot is configured to:
receive the first instruction, and repeatedly pick items indicated by the user order based on the packaging sequence and to place the picked items into the turnover box located on the put wall until the turnover box is filled with the items indicated by the user order;
wherein the put wall on which the filled turnover box is located is configured to be moved to a packing work space; and
the at least one packaging robot is configured to:
receive the second instruction, and move the items indicated by the user order from the filled turnover box, located at the packing work space, and place the items indicated by the user order successively into the packaging box.

6. The system according to claim 5, wherein
the packaging robot is configured to move the items in the turnover box to the packaging box successively by moving the items in the filled turnover box to the packaging box successively according to the spatial placement posture.

* * * * *